United States Patent

Wallace

[15] 3,664,492

[45] May 23, 1972

[54] TAPE CASSETTE SLEEVE

[72] Inventor: Robert S. Wallace, 2706 South Robertson Boulevard, Los Angeles, Calif. 90034

[22] Filed: Apr. 10, 1970

[21] Appl. No.: 27,296

[52] U.S. Cl. ....................... 206/1 R, 206/52 F, 206/DIG. 36, 220/41

[51] Int. Cl. ....................... B65d 85/67

[58] Field of Search ....................... 206/52 R, 52 F, 45.34, 65 R, 206/1 R, 42; 220/41, 8; 312/108, 111, 347; 229/9, 19

[56] References Cited

UNITED STATES PATENTS

| | | | |
|---|---|---|---|
| 3,106,288 | 10/1963 | Bolding | 206/52 R |
| 3,381,810 | 5/1968 | Lasher et al | 206/52 R |
| 3,502,204 | 3/1970 | James | 206/65 R |
| 3,028,207 | 4/1962 | Darnell | 312/111 |

*Primary Examiner*—William T. Dixson, Jr.
*Attorney*—White, Haefliger & Bachand

[57] ABSTRACT

The invention concerns a sleeve to receive insertion of a cassette case endwise of the sleeve, there being retainer means on the sleeve to flex as the cassette is inserted or withdrawn, and to unflex into reel openings in the cassette.

9 Claims, 6 Drawing Figures

INVENTOR
ROBERT S. WALLACE
BY White, Haefliger and Bachand

TAPE CASSETTE SLEEVE

BACKGROUND OF THE INVENTION

This invention relates generally to tape cassette containers, and more particularly concerns the simplification of such containers to enable quick loading of cassettes into the containers and removal of cassettes therefrom, and to reduce the expense of manufacture and handling of such containers.

The production and distribution of cassettes, as for example magnetic tape cassettes, has increased markedly over recent years. These devices comprise containers for reels and magnetic tape wound thereon, enabling rapid insertion of the cassettes into recording or play back equipment, eliminating direct handling of the tape by the user. Since the reels are "-floating" in many such cassettes, it becomes necessary to block their free rotation when the cassettes are handled outside the recorder, to prevent inadvertent unwinding of the tape in response to unwanted rotation of the floating reels. In the past cassette boxes have been used for this purpose; however, known boxes or containers are constructed with receptacles and lids therefor, necessitating removal of the lid to gain access to the receptacle interior for insertion or withdrawal of the cassette. Thereafter, the lid must be re-applied to the receptacle, and it frequently happens that the lid inadvertently comes loose, resulting in spilling of the cassette from the container and unwinding of the narrow tape from the reels, destroying the usefulness of the cassette. No way of eliminating this problem was known prior to the present invention.

SUMMARY OF THE INVENTION

It is a major object of the invention to provide a cassette receiving means eliminating the above problems and incorporating a number of unusual advantages including a one-piece lidless construction reduced to the essense of simplicity and characterized as overlooked by those skilled in this art. As will be seen, the means to block rotation of the reels also function to block inadvertent removal of the cassette from the receiving means, all in such manner as to contribute to ease of handling, simplicity of construction, and minimum cost of fabrication.

Basically, the invention is embodied in a sleeve sized to closely receive endwise insertion of the cassette case into the sleeve, and in such manner that flexible retainer means carried by the sleeve to project interiorly thereof is adapted to flex in response to such insertion, and thereafter to unflex and project into a tape winding reel opening. The retainer means may for example comprise a resiliently flexible plastic tab (or two such tabs in the case of a dual reel cassette) and which, when unflexed, blocks reel rotation as well as removal of the sleeve off the cassette.

The tab or tabs and the sleeve itself may have one-piece plastic construction, whether molded, blow-molded, extruded or die-stamped and folded into shape. Further, the sleeve opposite walls may be stepped inwardly toward the cassette interior for reasons as will appear, and the sleeve may be open ended at one or both ends to facilitate cassette insertion and withdrawal. Finally, a shoulder at one end of the sleeve may be utilized to limit cassette insertion, and a notch in the sleeve walls at the open end may facilitate grasping of the cassette for withdrawal.

These and other objects and advantages of the invention, as well as the details of an illustrative embodiment, will be more fully understood from the following specification and drawings, in which;

DRAWING DESCRIPTION

DETAILED DESCRIPTION

Figures 1, 2, 3, 4, 5, 6:
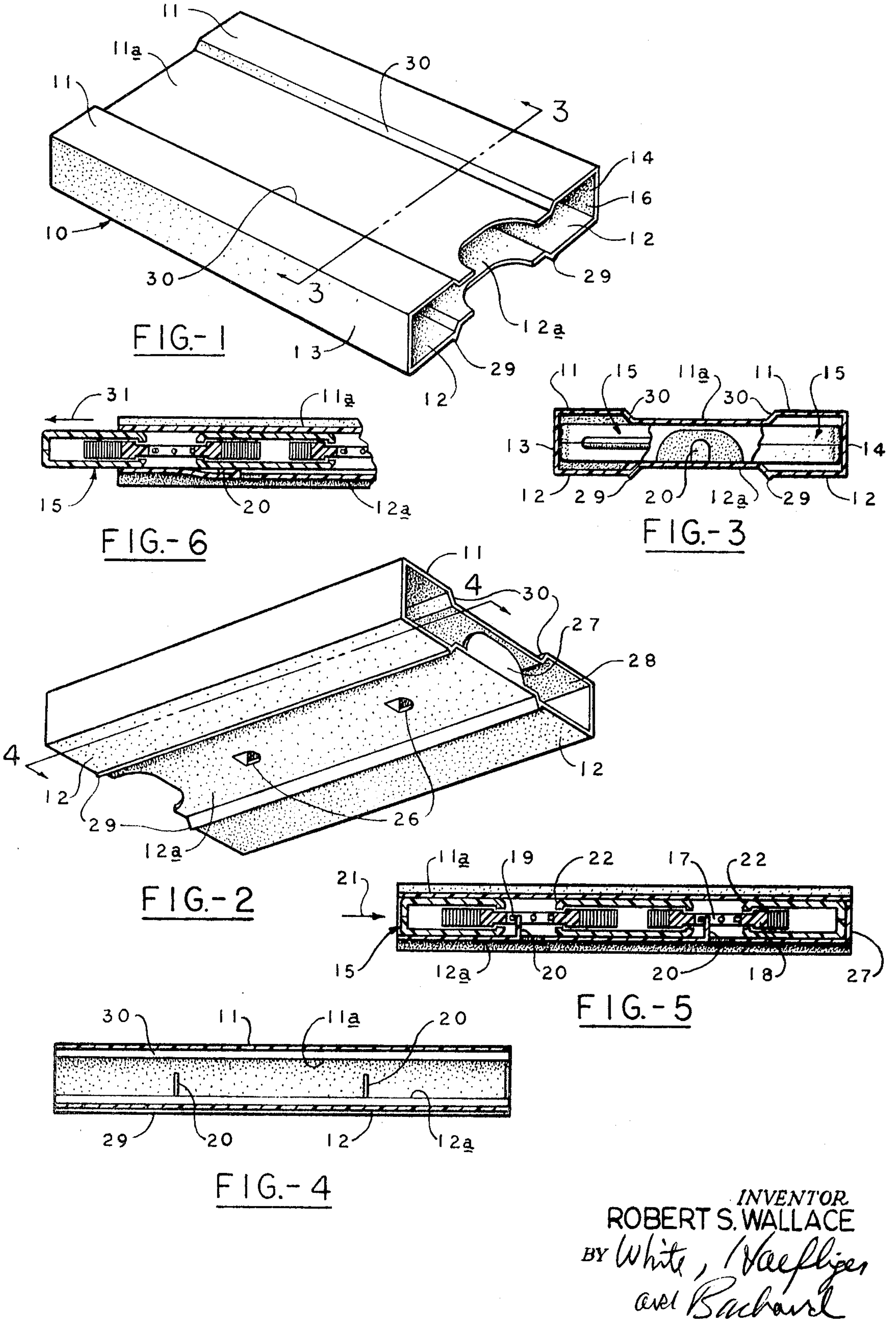
FIG. 1 is a perspective view showing the top, one end and one side of the sleeve.
FIG. 2 is a perspective view showing the bottoms, opposite end and opposite side of the sleeve.
FIG. 3 is an end view of the sleeve.
FIG. 4 is a section taken on line 4—4 of FIG. 2.
FIG. 5 is a center cross section of the sleeve, similar to FIG. 4, but showing retention of a cassette in the sleeve.
FIG. 6 is a fragmentary view like FIG. 5, but showing the cassette being inserted into the sleeve.

In the drawings, the sleeve 10 has opposite side walls 11 and 12, opposite end walls 13 and 14, and is sized to closely receive insertion of a cassette case endwise of the sleeve. Thus, the cassette 15 may be freely inserted in the sleeve open end 16, urged within the sleeve as seen in FIG. 6, and retained fully inserted within the sleeve as seen in FIG. 5.

With regard to such retention, flexible retainer means is carried by the sleeve to project interiorly thereof at a location (or locations) to flex upon cassette insertion, and to unflex and project into openings 17 in the tape winding reels 18 of the cassette. In this regard, the reels are annular and may have driven shoulder structure, as for example spokes 19, proximate the openings, as for example projecting therein.

The retainer means may comprise, with unusual advantage, a resiliently flexible plastic tab or tabs 20 adapted to flex to allow insertion and withdrawal of the case. Once complete or near-complete insertion in the direction of arrow 21 in FIG. 5 is accomplished, the tabs resiliently unflex to the positions as there seen wherein the tab or tabs project through openings 22 in the cassette walls 23 and into the reel openings 17, and between the spokes 19 for blocking reel rotation. Note also that the tabs thereupon also block inadvertent removal of the cassette from the sleeve. The latter can be overcome by pulling the cassette from the sleeve, to thereby flex the tabs out of the openings 17 and 22, with withdrawal direction being shown at 31 in FIG. 6.

Walls 11 and 12 may be stepped at 11*a* and 12*a* toward the sleeve central interior, and lengthwise of the sleeve, to closely hug the cassette walls 23 and 23*a*, while the thicker head portion 15*a* of the cassette may fit closely between sleeve walls 11 and 12. The latter are located symmetrically at opposite sides of the stepped walls 11*a* and 12*a*, as shown. Wall 12*a* may have openings 26 produced upon punch out formation of the tabs 20.

The sleeve may have one-piece plastic construction, molded, blow-molded, extruded, or die-stamped and folded into shape with heat sealing at brought-together edges.

A shoulder 27 at opposite end 28 of the sleeve limits cassette insertion into the sleeve, as desired; however, that shoulder may be eliminated.

Longitudinal guide projections 29 on the case wall 12 are adapted to interfit the shoulders 30 on wall 11, to permit stacking and sliding of multiple cassettes.

I claim:

1. Apparatus for receiving a tape cassette and blocking tape winding reels therein against rotation, the reels forming openings exposed through a wall of the cassette case, comprising
   a. a sleeve having an open end sized to closely receive insertion of the cassette case endwise of the sleeve via said open end, and
   b. flexible retainer tab means comprising two flexible tabs carried by the sleeve and sized to project interiorly thereof at a location to successively flex upon said insertion of the cassette case into the sleeve, and thereafter to unflex and project into the reel openings, said retainer tabs being in face to face alignment and spaced apart in said insertion direction and both facing frontally toward said open end of the sleeve.

2. The apparatus as defined in claim 1 wherein each reel is annular and has driven shoulder structure proximate said opening, and said retainer means is sized to project into rotation blocking relation with said shoulder structure.

3. The apparatus of claim 2 including said cassette received in said sleeve with said retainer tabs projecting into said reel openings.

4. The apparatus of claim 1 wherein said retainer tabs and sleeve consist of resiliently flexible plastic material.

5. The apparatus of claim 1 wherein the sleeve is open at both ends thereof.

6. The apparatus of claim 1 wherein the sleeve has generally rectangular cross sectional configuration in planes normal to the endwise direction of cassette reception into the sleeve, the sleeve having opposed walls with portions stepped toward the sleeve interior and lengthwise of the sleeve, said retainer tabs carried by said stepped portions.

7. The apparatus of claim 6 wherein the sleeve and retainer tabs have one-piece construction.

8. The apparatus of claim 1 wherein the sleeve has opposite walls which are stepped inwardly toward the sleeve central interior and lengthwise of the sleeve, with guide shoulders adapted to interfit upon stacking of multiple cassettes.

9. The apparatus of claim 1 in which the sleeve has a shoulder proximate its opposite end to limit cassette insertion into the sleeve.

* * * * *